UNITED STATES PATENT OFFICE.

JOHN DAYMON, OF CARDINGTON, PENNSYLVANIA.

COMPOSITION OF MATTER FOR COATING ROOFS OR MASONRY.

SPECIFICATION forming part of Letters Patent No. 515,859, dated March 6, 1894.

Application filed June 23, 1892. Serial No. 437,786. (No specimens.)

*To all whom it may concern:*

Be it known that I, JOHN DAYMON, a citizen of the United States, residing in Cardington, Delaware county, Pennsylvania, have invented a new and useful Composition of Matter for Coating Roofs or Masonry, of which the following is a specification.

It is the object of my invention to provide a composition of matter which is inexpensive, readily compounded, and water and weather proof, and is therefore adapted for use to form a protective sheathing or coating for pipes, masonry, and structures exposed to the weather, but especially adapted for use as a roofing material.

To form my improved composition of matter I prefer to employ the following ingredients, namely, clay, half slaked lime, oxide of iron, linseed oil, or fish oil, and, if desired, japan, and turpentine. The clay employed is preferably brick clay, and said clay and the half slaked lime, are to be, while perfectly dry, ground to a flour like powder. To one bushel of the clay and one half bushel of the half slaked lime I add thirty pounds of oxide of iron, six gallons of mixed linseed and fish oil, and I mix these ingredients together until they are thoroughly commingled and the mass reduced to a uniform and homogeneous condition; to this mass may be added one pint of japan, as a drier, and also one quart of turpentine. The composition of matter thus formed is of a cement-like character, and I prefer to term it a cement. The ingredients mentioned are those which I prefer to employ.

To form with my improved cement a covering for a roof of a building I proceed as follows: I sheathe or cover the roof with a layer of overlapping and suitably secured breadths of sheathing formed by first subjecting cloth, conveniently unbleached cotton, or heavy paper, to a bath formed by dissolving two pounds of glue in five gallons of water and then adding three pounds of the cement and mixing and stirring the whole thoroughly together,—and by, after the cloth or paper has been allowed to dry, second, covering it with a quantity of fresh cement so that it becomes coated with said cement. Upon the sheathing with which the roof is thus covered I apply a thick coat of the cement. The cement when applied hardens into stone-like solidity, is impervious to water, and is uninjured by heat; it forms a smooth and uniform facing, and may be painted any desired color. The cement is also a non-conductor of heat, this together with its cheapness, and plastic character when fresh, renders it of value as a coating and protection for pipes exposed to the weather. The cement may also be employed for sheathing the wall as well as the roof of a building, and may also be employed in a variety of applications not herein mentioned.

Having thus described my invention, I claim—

A composition of matter for coating roofs or masonry, consisting of dried and powdered clay, dried and powdered partly slaked lime, oxide of iron, oil, and japan, substantially as set forth.

In testimony that I claim the foregoing as my invention I have hereunto signed my name this 31st day of May, A. D. 1892.

JOHN DAYMON.

In presence of—
WM. C. STRAWBRIDGE,
F. NORMAN DIXON.